Feb. 13, 1962 J. G. CRUMP 3,020,919
COLLAPSIBLE SHELTER
Filed Dec. 5, 1958
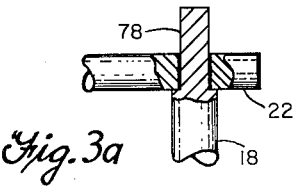
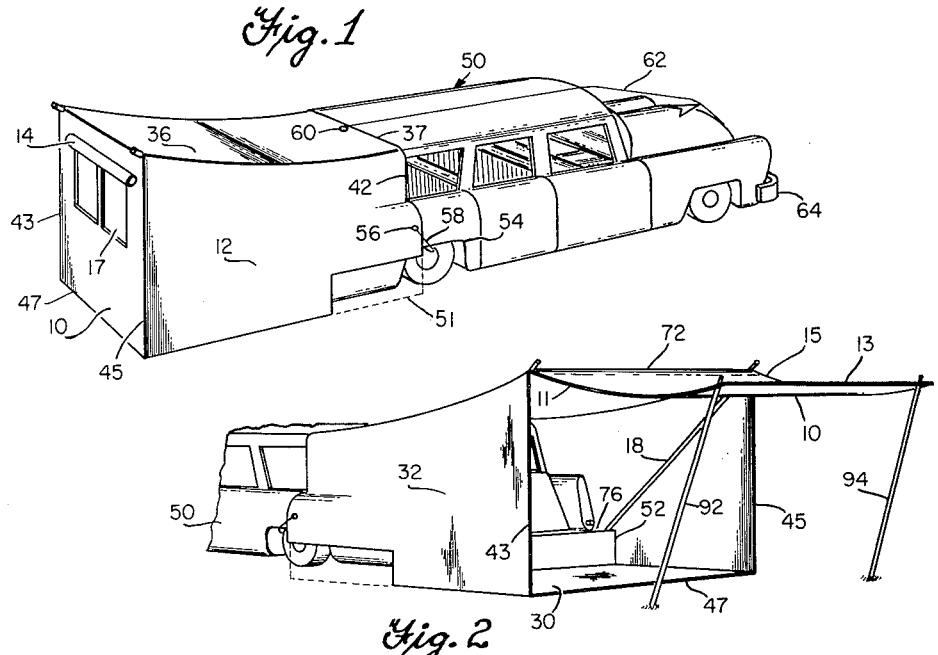
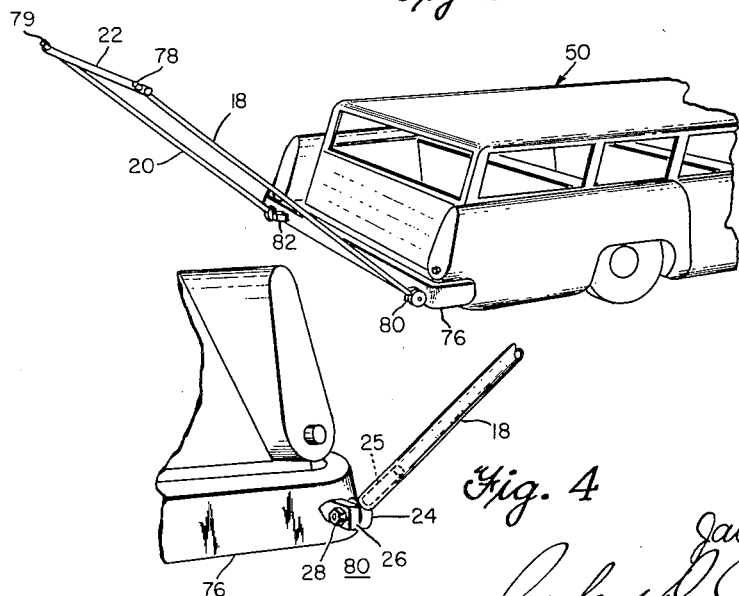
INVENTOR
Jack G. Crump United States Patent Office 3,020,919
Patented Feb. 13, 1962

3,020,919
COLLAPSIBLE SHELTER
Jack G. Crump, Columbus, Ohio
(1211 N. Chestnut, Arlington Heights, Ill.)
Filed Dec. 5, 1958, Ser. No. 778,408
2 Claims. (Cl. 135—1)

This invention relates generally to shelters and particularly to a collapsible and transportable shelter that is especially adaptable to a motor vehicle.

In recent years the trend has been towards the greater use of the station wagon type of motor vehicle. An important feature of this type of motor vehicle is that it permits greater maneuverability of the occupants and greater use of the vehicle for transporting material goods. These factors lend themselves to utilizing the station wagon for camping trips and vacations. Unfortunately, however convenient the station wagon may be in camping, it is not sufficiently suitable for remaining in a camping area except for short periods of time. Other accommodations for overnight sleeping and general housekeeping are required.

The present invention provides a collapsible structure that is readily adaptable to a station wagon type of motor vehicle to convert the same to an enlarged and convenient shelter area for overnight sleeping and general housekeeping.

It is accordingly, an object of the present invention to provide a new and improved shelter area.

It is a further object of the present invention to provide a new and improved shelter that is readily adaptable to a motor vehicle.

It is also an object of the present invention to provide a shelter that is collapsible and easily transportable.

It is another object of the present invention to provide a shelter that is readily adaptable to present day motor vehicles with only a bare minimum of alteration thereto.

Further objects and features of the present invention will become apparent from a detailed description of the present invention taken in conjunction with the accompanying drawings in which:

FIG. 1 is a perspective view of a preferred embodiment of the present invention.

FIG. 2 is another perspective view of the preferred embodiment of the present invention.

FIG. 3 shows the ridge-poles placed in position for supporting the shelter shown in FIG. 1 and FIG. 2.

FIG. 3a illustrates the details of the supports of FIG. 3.

FIG. 4 shows the simplified mounts for anchoring the ridge-poles of FIG. 3 to the motor vehicle.

Referring now to FIG. 1 there is shown a preferred embodiment of the present invention which very generally comprises a box-like structure having either end open. The one open end is adapted to fit over the motor vehicle for support and securing thereto; the other end is provided with support means for maintaining the structure in a rigid manner. Also provided for this end is a wall to complete the enclosure.

More specifically the structure of FIGS. 1 and 2 comprises outer wall sections 12 and 32 joined by a roof section 36 and a floor section 30. The one end of the structure has an opening closely approximating in size to that of the outer dimensions of a motor vehicle 50. Although the motor vehicle 50 shown together with the preferred embodiment is of the station wagon type, it is understood that the invention may as readily be adaptable to any other type of motor vehicle. The outer walls 12 and 32 have their ends such as 42 in close fit to the overall contour of the vehicle 50 down to the bottom end of the fender skirt 54. A rectangular area extending from the bottom end of the fender skirt 54 to the ground in one direction and from the bumper 76 to the end of the structure in the other direction such as shown at 51, is removed from the wall sections 12 and 32. The corresponding length of floor area is raised and secured to bumper 76 to form a wall 52 against the underside of the motor vehicle 50. Outer walls 12 and 32 are joined to the roof 36 also having its end 37 in contact with the roof contour of the motor vehicle 50. The entire end structure of outer walls 12 and 32 and roof 36 is designed to snugly fit any particular type of motor vehicle by the natural drop of the structure pulled snug by attachment of the hook 58 to the under side of the skirt 54 and the eyelet 56. In some models of motor vehicles which have unusual curves, such as at 70, folds may necessarily have to be made in the end 42 for a tighter fit to the contour of the vehicle 50. The structure may further be secured to the motor vehicle 50 by a line or rope 62 extending from eyelet 60 in the end 37 of the roof 36 to the bumper 64. The number of these lines will of course vary with the size and weight of the overall structure.

The opposite end of the structure of FIGS. 1 and 2 is provided with a rear wall 10 that is generally permanently secured to the end 72 of the roof 36. This wall 10 can be supported in a horizontal position by poles 92 and 94 to extend the structure with a porch area. Also included in the end wall 10 is a pair of screened windows 17 to provide for ventilation when the wall 10 is secured to the remainder of the structure. These windows may be closed for protection and privacy by unrolling the covering 14. For security the ends 11, 13 and 15 of the rear wall 10 are fastened such as by one continuous zipper to the upright ends 43 and 45 of the side walls and the end 47 of the floor 30. Alternately a combination of zippers, snaps or ties may be used.

To support the entire structure in a rigid-like manner there are provided poles 18 and 20 and cross piece 22 shown in FIG. 3. Each end of the cross piece 22 is provided with an aperture for inserting therein the elongated necked-down section 78 and 79 of the pole pieces 18 and 20 as shown in FIG. 3a. Other means of providing an end of reduced diameter 78 and 79 for the pole pieces 18 and 20, such as by insertion of a pin in the end thereof, may be obvious. Since the poles 18 and 20 are the only extended or bulky parts of the shelter they are preferably telescoped and snapped into place. In this manner the entire structure may be easily put into place or just as easily disassembled and made into a small package for transporting and occupying only a minimum of space in the vehicle.

To support the ridge-poles 18 and 20 in a general upright position there are provided on the bumper of the vehicle the mounts 80 and 82 shown in more detail in FIG. 4. The mounts 80 and 82 are fastened to the motor vehicle 50 by removing a pair of corresponding bumper bolts on either end of the bumper 76. In the holes left by removal of these pieces there is inserted the support piece 26 and secured to the bumper support to fully replace the bumper bolt. The configuration of the support piece 26 may take any form. Through the center of the support piece 26 there is provided a hole for supporting thereon, such as by bolting, the adjustable pole support 24. On the adjustable pole support 24 there is an elongated nipple 25 adapted to be inserted in the bottom end of the pole 18.

The supporting poles 18 and 20 and the crossbar 22 are held in a supporting position to the end 72 of roof section 36 by inserting the extended neck-down sections 78 and 79 through eyelets in either corner of the roof section 36.

As shown in FIGS. 1 and 2 the end of the structure opposite that of the vehicle is greater in size. That is, the wall sections 12 and 32 and roof 36 approximate a trapezoidal shape with its greater dimension at this end. The length of the wall sections 12 and 32 and roof 36 and the height of the wall sections 12 and 32 at this end may be varied extensively. It is apparent therefore that since the primary support is by the poles 18 and 20 positioned on the mounts 80 and 82, the adjustable supports 24 and 25 are adjustable in the vertical to provide for the angle made by poles of varying length. Also by loosening the nuts securing the pieces 26 and 27 to the bumper 76 the entire mounts 80 and 82 may be swung in the horizontal plane so as to provide the adjustment needed in vehicles having different bumper bolt spacings.

From the above it is seen that there is provided a transportable structure that may be easily assembled and fitted onto a motor vehicle with only the minimum of effort and with only minor modification to the vehicle. The structure when assembled to a station wagon type of motor vehicle will permit the tail gate to be opened normally to extend the livable area thereof.

Although the structure shown is that of my preferred embodiment, it is obvious that modifications may be had without departing from the scope of the invention.

What is claimed is:

1. A collapsible shelter particularly adaptable to a motor vehicle having a body, a pair of fender skirts on the rear of said body, and a front and rear bumper comprising: a pair of side walls, roof, and floor sections, said sections joined to form a box-like shelter having a pair of open ends; means for fitting one of said open ends over the rear section of said motor vehicle; means for fastening one end of the roof section of said open end to the forward section of said motor vehicle, and means for fastening one end of the wall sections of said open end to said fender skirts; said wall sections having a section removed therefrom extending from said fender skirts to its lowermost portion and extending in the transverse direction from its forward end to the position generally defined by said rear bumper, said floor section extending from its forward end to said bumper adapted to be raised, and means for securing said raised floor section to said rear bumper; support mounts fixedly positioned on said rear bumper of said motor vehicle, and a pair of rigid pole pieces joined to said support mounts and the upper part of the open end of said shelter opposite the end secured to said motor vehicle to rigidly support said shelter.

2. A collapsible shelter particularly adaptable to a motor vehicle having a body and a front and rear bumper comprising: a plurality of sections including a pair of side walls, a roof and a floor, said sections joined to form a box-like shelter having a pair of open ends; means for securing one end of said roof section at one of said open ends to said front bumper, and means for fastening one end of said wall sections to the rearmost portion of said body; support mounts fixedly positioned on said rear bumper of said motor vehicle, and a pair of rigid pole pieces joined to said support mounts and the upper part of the open end of said shelter opposite the end secured to said motor vehicle to rigidly support said shelter, said support mounts comprising a first member adapted to secure said rear bumper to said motor vehicle, a second member rotatably positioned to said first member, and an elongated portion fixedly attached to said second member which has an outside diameter less than the inside diameter of said pole pieces; said pole pieces having a necked-down portion on one end thereof, a crossbar member having an aperture in either end thereof adapted to receive said necked-down portion, said necked-down portion extending through said aperture, said roof section having at its end opposite to that secured to said motor vehicle means for receiving said necked-down portion extending through said aperture.

References Cited in the file of this patent
UNITED STATES PATENTS

| | | |
|---|---|---|
| 1,178,734 | Krause | Apr. 11, 1916 |
| 1,260,612 | Whall | Mar. 26, 1918 |
| 1,607,020 | Stoll | Nov. 16, 1926 |
| 2,132,238 | Haisty | Oct. 4, 1938 |
| 2,480,509 | Ripley | Aug. 30, 1949 |
| 2,642,587 | Taylor | June 23, 1953 |
| 2,815,762 | Smith | Dec. 10, 1957 |
| 2,831,489 | Weber | Apr. 22, 1958 |

OTHER REFERENCES

Popular Mechanics (magazine) article, "Fast-Erecting Tent for Auto Campers Hinges to Rear Bumpers," published July 1953, page 97.